United States Patent [19]
Nelson

[11] 3,915,011
[45] Oct. 28, 1975

[54] DEVICE FOR SAMPLING FLUIDS AND SLURRIES

[76] Inventor: Roger R. Nelson, 4125 E. 6th St., Tucson, Ariz. 85711

[22] Filed: Mar. 18, 1974

[21] Appl. No.: 451,809

[52] U.S. Cl............................................... 73/421 B
[51] Int. Cl.²........................................... G01N 1/14
[58] Field of Search............ 73/421 B, 422 TC, 446, 73/447; 204/1 T, 295 R

[56] References Cited
UNITED STATES PATENTS

| | | | |
|---|---|---|---|
| 2,700,299 | 1/1955 | Fankboner et al.................... | 73/446 |
| 3,012,438 | 12/1961 | Pochan et al......................... | 73/447 |
| 3,587,670 | 6/1971 | Brailsford........................... | 73/421 B |

FOREIGN PATENTS OR APPLICATIONS

| | | | |
|---|---|---|---|
| 1,171,180 | 5/1964 | Germany............................ | 73/421 B |
| 934,737 | 8/1963 | United Kingdom................ | 73/421 B |

Primary Examiner—S. Clement Swisher
Attorney, Agent, or Firm—J. Michael McClanahan

[57] ABSTRACT

A device for sampling fluids, mixtures of fluids and solids (slurries), and emulsions comprising sampling tube means immersed in a tank or vat containing the fluid or mixture to be sampled. The material to be sampled may be in the process of agitation. A sampling tube is capped at one end with means for fluid level indicating probes communicating through said capped end, an air line communicating interiorly through the capped end, means for ion sensing electrodes extending through the capped end in communication with the fluid in the sampling tube, means for withdrawing samples, and means for rinsing the sampling tube interior and ion sensing electrodes. Additional control means are provided exteriorly to the sampling tube for orderly sequencing of the sampling process. The slurry is permitted to rise at a controlled rate in the sampling tube by means of atmospheric pressure or by withdrawing air from the sampling tube, the level sensing probes provide information as to the level of the fluids in the sampling tube, the ion sensing electrodes are utilized, samples are withdrawn by vacuum means from the sampling tube to a secondary sampling container for recovery, analysis, and/or storage.

After the sampling procedure has been accomplished on the sample in the sampling tube, air means eject the fluid out the lower end of the sampling tube, the ejection being sensed by the level probes and means provided for the washing of the probes, the electrodes and the sample withdrawal means. The cycle may then be repeated at desired intervals.

11 Claims, 2 Drawing Figures

DEVICE FOR SAMPLING FLUIDS AND SLURRIES

BACKGROUND OF THE INVENTION

There are various sampling means to sample fluids, mixtures of fluids and solids (slurries), and emulsions in agitated vats however, there are instances where it is desired to sample a portion of the fluid and slurry in the agitated vat when the sampling and measurements are desired to be made upon the fluid while in a quiescent state and where there has been settling out of particles in the fluids and slurries. This is provided in the instant invention.

SUMMARY OF THE INVENTION

That the present invention comprises apparatus and process for sampling fluids, mixtures of fluids and solids (slurries), and emulsions, hereinafter fluids, whereby a sampling tube communicates with the fluid containing vat that which permits the fluids to enter one end of the sampling tube for sampling and, if desired, removal. The entrance of the fluid into the sampling tube is measurably controlled by pneumatic means; the rate of entry of the fluids and slurries permitting the sampled fluids and slurries to reach the desired quiescent state. The sampling upon the fluid is then permitted by ion sensing probe means or other appropriate means, and removal of the sample of the fluid is facilitated by pneumatic vacuum means.

After the operation is completed, the sample of fluids in the sampling tube is ejected by pneumatic means, the sampling tube interior and apparatus therein contained is washed with cleaning fluids as desired and the process repeated as necessary.

Accordingly, it is an object of the present invention to provide a means to sample a fluid, slurry, or emulsion.

Further, it is an object of the present invention to sample a fluid, slurry or emulsion in a quiescent state.

It is an additional object of the present invention to provide a means to withdraw a sample of fluid, fluid of a slurry, or emulsion.

DETAILED DESCRIPTION

Figure 1:
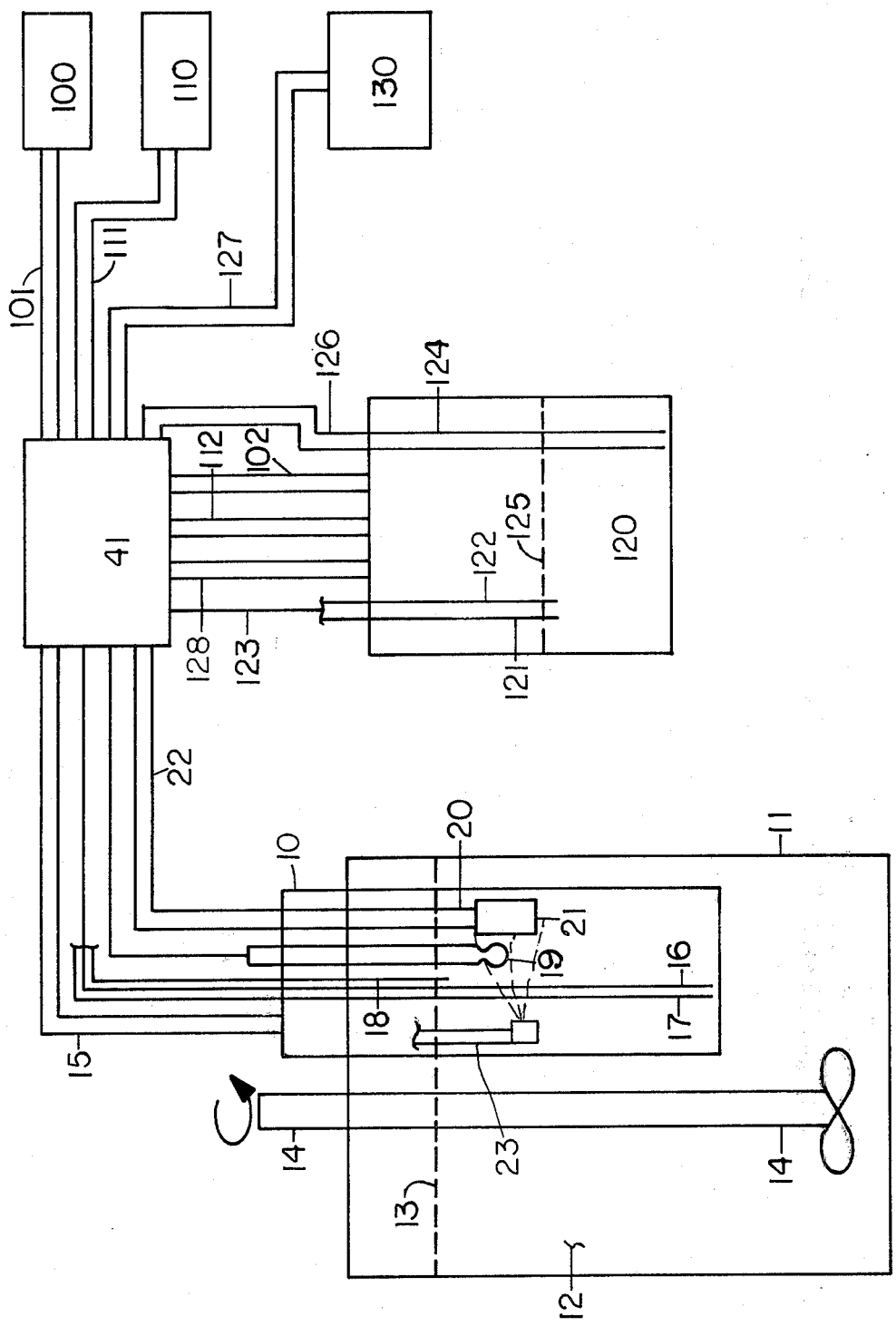
FIG. 1 is a schematic view of the present invention in its operation as a sampling device.

The embodiment of the invention shown in FIG. 1 comprises sampling tube 10 for immersion in a representative holding vat 11 containing the fluid, slurry, or emulsion to level 13, said fluids being agitated by agitator 14. The representative vat holding the fluids, emulsions or slurries may be an integral part of a separate process of manufacture (not shown). Communicating through the upper end of sampling tube 10 is air line 15 which also connects to the controller 41. Similarly communicating through the upper end of sampling tube 10 to the fluid and solid emulsion slurry level are level sensing probes comprising common probe 16, low level probe 17 and high level probe 18. The level sensing probes feed into controller 41. Ion sensing electrode 19 also extends longitudinally through the upper end of sampling tube 10 to be immersed in the fluid, emulsion or slurry 12 with similar output connection to controller 41. Samples of the fluid, emulsion or fluid of the slurry, are removed by means of tube 20 which extends through the upper portion of the sampling tube 10 to communicate with slurry 12 having connected to its end a fritted glass attachment 21 if same is desired or required. Sample removing tube 20 similarly feeds into controller 41 by means of line 22.

To controller 41 are operably attached air tank 100 which provides a source of compressed air, vacuum pump 110 which provides the vacuum necessary for withdrawing a sample of the fluid from sampling tube 10 through controller 41 and secondary sampler 120 comprising means for receiving and temporarily holding samples taken from sampling tube 10. Vacuum pump 110 is operably connected through controller 41 to secondary sampler 120 by means of lines 111 and 112 respectively. Air tank 100 is connected through controller 41 by means of air line 101 and to secondary sampler 120 by line 102. Secondary sampler 120 receives samples from the sampling tube 10 through controller 41 by means of line 22 and line 128.

Secondary sampler 120 has level sensing probes 121 and 122 which operably connect to controller 41 through line 123. The sample of the fluid and solid emulsion slurry is held in secondary sampler 120 and transferred by air pressure means to the field sample receiver 130 by means of tube 124 extending longitudinally through the secondary sampler 120 and communicating with the 125 sample held, tube 126 connected to tube 127 which connects with the field sample receiver 130.

Figure 2:
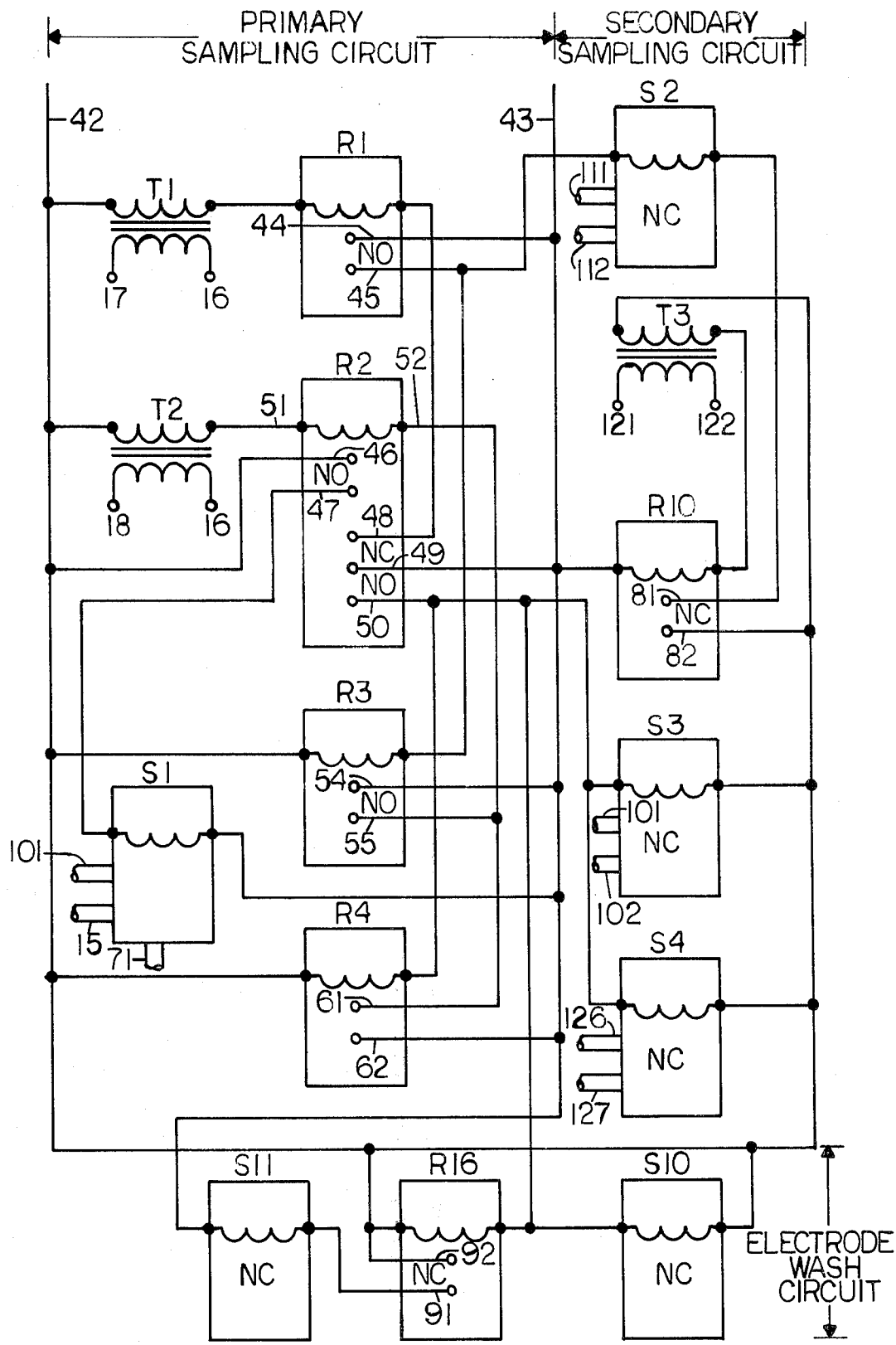
FIG. 2 is a schematic diagram of the controller which sequences the operational steps of the invention.

FIG. 2 of the drawings shows in a schematic form the operational components of controller 41. The controller is divided into two sampling circuits — the primary sampling circuit and secondary sampling circuit, and an electrode wash circuit. The primary sampling circuit controls the operation of sampling tube 10 and secondary sampling circuit controls the sequential operation of the secondary sampler. The electrode wash circuit operates after all sampling has been accomplished to wash the apparatus and prevent a prior sample from contaminating the next sample taken.

AC power input lines 42 and 43 provide the primary source of power for both the primary and secondary sampling circuit and additionally provides operating means for fluid level sensing. To the primary side of the sensing transformers T1 and T2 are connected the sampling tube 10 fluid level sensing probes as follows: high level probe 18 and common probe 16 are connected to primary side of transformer T1 and low probe 17 and common probe 16 are connected to the primary side of transformer T2. Sensing transformers T1 and T2 are of the commercial type which provide an output when an electrical connection through a liquid is made across the probes. When sampling tube 10 is initially inserted into vat 11 (FIG. 1), or if in the initial operation the fluid and emulsion slurry 12 fills vat 11, the fluid enters sample tube 10 by virtue of solenoid valve S1 venting the entrapped air to the atmosphere through vent 71. The rise of the liquid in the sampling tube is done in a known controlled manner, namely by means of orfice means through which the air must escape as the liquid rises. In the preferred embodiment, with normal atmospheric pressure acting upon the fluid, emulsion or slurry in the vat, the time of rise of the fluid in the sampling tube is variable from one minute to thirty minutes. Should a faster rise time be desired, it is possible for the vacuum pump 110 to be connected to the vent 71 of the solenoid valve S1. The vent is normally open to the atmosphere.

Upon the rise of the fluid in the sampling tube contact is first made with the low level probes 18 and 16 of sensing transformer T2. At that time relay R2 will energize if the relay coil circuit 51 and 52 are given a path to AC power return 43. Time delay relay R3, at this point, is not energized as it depends upon an output of high level sensing transformer T1 to energize R1 (in addition to the normally closed contacts 48 and 49 of relay R2). The only other possible method for relay R2 to energize is through reversing relay R4 which is of the type that upon receipt of an energizing pulse of power it changes from its prior state. If contacts 61 and 62 of reversing relay R4 are closed, then the path of energizing relay R2 is complete and relay R2 changes state with the following consequences: normally opened contacts 46 and 47 now close to energize solenoid valve S1 which switches air line 15 from vent 71 to source of air pressure line 101. Instantaneously with the switching of solenoid valve S1 the reversing relay R4 receives a pulse of electricity through the theretofore normally opened contacts 49 and 50 which causes the reversing relay to open its contacts 61 and 62 which in turn places relay R2 in its unenergized state. The momentary rush of high-pressure air through solenoid valve S1 into sample tube 10 is merely a flutter of the solenoid switch S1 as S1 returns to its normally vented state and relay R2 contacts 46 and 47 return to their normally open position.

The desired starting position for the contacts of reversing relay R4 is normally open and if at the time that the operation of the invention is commenced the contacts are closed, they immediately go to the open state upon the low level liquid sensing operation described above.

The fluid level in sample tube 10, after the flutter of the high pressure through solenoid valve S1 and the changing state of relay R2, rises in the sampling tube 10 and re-engages low liquid level probe 17 and common probe 16 (if the momentary flutter of the air pressure forced the liquid level below the low level probes) which again indicates an output from sensing transformer T2. Transformer T2's output does not energize relay R2's coil as there is no return path to AC power line 43, either through time delay relay R3 or reversing relay R4.

The liquid level will continue to rise in the sampling tube at a measured rate through solenoid valve S1's venting of the entrapped air in sampling tube 10. The preferred embodiment anticipates that the time required for the fluid to rise from the lower sensing level probes will be in the order of one minute to thirty minutes as desired. These times, of course, are not limitations of the invention but only speak of the preferred embodiment. If a slurry is being sampled, ample time is permitted as it rises in the sampling tube 10 for the solid particles contained in the slurry to settle out. By the time the fluid level reaches the proximity of the ion sensing probe 19 and the apparatus 20 and 21 for sample removing, the upper layer of the slurry is in a clear liquor state.

The fluid rises to contact the high liquid level probe 18 (and common probe 16) at which time the sensing transformer T1 indicates an output. The output of T1 energizes relay R1 as the electromagnetic coil of relay R1 is provided a path through the normally closed contacts 48 and 49 of unenergized relay R2. Relay R1 contacts 44 and 45 switch from their normally open state to a closed state which in turn energizes time delay relay R3 and starts its built-in time delay period. Relay R1 also provides a source of power to a secondary sampling circuit solenoid switch S2 (which will be discussed later).

Time delay relay R3, in its preferred embodiment, is adjusted in the range of thirty seconds to five minutes delay. The purpose of the delay is to permit the ion sensing probe to obtain a stabilized output reading as these devices are inherently slow and to permit an opportunity for a sample to be removed from the sampling tube 10, which removal is accomplished through the secondary sampling circuit.

At the termination of the inherent delay of time delay R3 the normally opened contacts 54 and 55 close which completes the electrical path for the output of sensing transformer T2 through the energizing coil of relay R2 to the AC power return 43.

At this point normally opened contacts 46 and 47 of relay R2 close which energizes solenoid valve S1 to switch the source of air pressure line 101 to the air line 15 communicating with the upper portion of sampling tube 10. By this time the secondary sampler circuit has completed its operation of removing the sample from the sampling tube 10 and the ion sensing probe has had ample opportunity to sense and record its reading. Simultaneously with the air pressure beginning to force the sample out of the sampling tube 10, the normally closed contacts 48 and 49 of relay R2 open, de-energizing relay R1 and inhibiting the secondary sampling circuit, and the normally open contacts 49 and 50 of relay R2 close sending an electrical pulse to reversing relay R4 changing the position of the contacts 61 and 62 from an open to a closed position. Time delay relay R3 closed contacts 54 and 55 now open as the energizing power to time delay relay R3 is inhibited as the contacts 44 and 45 of relay R1 fall back to their normally opened state. Nevertheless, relay R2 is kept energized through the now closed contacts 61 and 62 of reversing relay R4. The system remains in this state with the air pressure forcing the fluid down in the sampling tube. As the fluid passes the high liquid level probe 18 and common probe 16, sensing transformer T1 no longer indicates an output, noting however, that relay R1 was previously inhibited by the open contacts 48 and 49 of energized relay R2.

When the fluid has been forced down below the low liquid level contacts 17 and 16, the output of sensing transformer T2 ceases which de-energizes relay R2 permitting it to return to its normal unenergized state. At this point, contacts 46 and 47 open causing solenoid valve S1 to cease supplying high pressure air to sampling tube 10 and proceeds to vent the sampling tube through air line 15 and vent 71. Open contacts 48 and 49 return to their normally closed state allowing operation of relay R1 when the high liquid level sensing transformer T1 indicates an output. Closed contacts 49 and 50 return to their normally open state removing power from reversing relay R4, although this does not change position of contacts 61 and 62 from their prior state. The sequential sampling operation above described may now repeat itself.

The secondary sampling circuit, which was referred to above as operating during the period of time after the high liquid level probes are contacted by the fluid and for which time delay relay R3 provided opportunity to complete operates as follows. Upon the closing of relay R1 contacts 44 and 45 and through relay R10 normally closed contacts 81 and 82, solenoid valve S2 is energized. Solenoid valve S2 connects secondary sampler 120 with vacuum pump 110 by means of lines 112 and 111 respectively (FIG. 1). The sample is withdrawn from sampling tube 10 through fritted glass tube 21 attached to tube 20 extending longitudinally into sampling tube 10 from the top most end, through line 22 into controller 41 and thereafter line 121 to secondary sampler 120. The fluid is drawn into secondary sampler 120 until the desired amount is obtained as indicated by level sensing probes 121 and 122 which sense the level of the fluid causing sensing transformer T3 to produce an output. The output of T3 energizes relay R10 causing normally closed contacts 81 and 82 to open which in turn causes solenoid valve S2 to cease withdrawal of the fluid from sampling tube 10 into the secondary sampler 120.

The secondary sampling circuit then goes into a quiescent or dormant state until time delay relay R3, which permitted time for the withdrawal of the sample, has had its time period expire. At the expiration of the time period, contacts 54 and 55 close permitting the energization of relay R2 and closing of normally open contacts 49 and 50. Solenoid valves S3 and S4 are then energized as is the electrode wash circuit which will be explained later.

Solenoid valve S3 supplies air pressure to secondary sampler 120 by means of air lines 101 and 102. Solenoid valve S4 is merely an open-shut valve connected to sample withdrawal line 126 which permits the sample to be forced out of secondary sampler by air pressure to a field sample depository 130 through line 127. The operations of solenoid valve S3 and S4 are terminated when the relay R2 goes back into its normal unenergized state. The secondary sampling operation is then complete and is utilized again in the same sequential operation as described above.

The electrode wash circuit means provides for washing the ion sensing probe 19, and if desired, the sample removing apparatus 20 and 21, and the liquid level sensing probes 16, 17 and 18. It consists of apparatus 23 to spray the above listed apparatus within sampling tube 10 with an appropriate wash.

The electrode wash circuit comprises relay R16 which is energized through relay R2 contacts 49 and 50 when relay R2 itself is energized, such time being the time when the fluid in the sampling tube has risen to its top most position, the sample has been withdrawn and the fluid has just started to be ejected from the sampling tube 10. At that time, solenoid valves S11 and S10, which valves are connected in series in the line prior to the spray head fixture, open and permit the wash spraying of the contained apparatus. Time delay relay R16 times the wash period and upon the expiration of the selected time period, nominally five to ten seconds, the normally closed contacts 91 and 92 open which close solenoid valve S11 and shut off the flow of wash fluid therethrough. Solenoid valve S10, in series with S11, remains open throughout the period of time that relay R2 remains energized, which is the period of time that air pressure is clearing the sampling tube 10. Solenoid valve S10 returns to its normally closed state as relay R2 de-energizes.

While a preferred embodiment has been shown and described, it will be understood that there is no intent to limit the invention by such disclosure but, rather, it is intended to cover all modification and alternate constructions falling within the spirit and scope of the invention as defined in the appended claims.

What is claimed is:

1. A device for sampling fluids, mixtures of fluids and solids, and emulsions comprising sampling tube means communicating with a fluid, mixture of fluid and solids, or emulsion in an associated container, and controller means operably connected to said sampling tube means, said sampling tube means including a vertically positioned elongated, cylindrical tube enclosed at said upper end having located interiorly therein means for detecting the characteristics of the fluid, mixture of fluids and solids, and emulsions, and means for sensing the level of the fluid, mixture of fluids and solids, and emulsions therein, and pneumatic line means operably connected to said sampling tube enclosed end; said fluid, mixture of fluids and solids, and emulsion level sensing means and characteristic detection means and said pneumatic line means operably connected to said controller means; and said controller means having regulatory controlling means to regulate said fluid, mixture of fluids and solids, and emulsions entering said sampling tube lower end, to detect characteristics of a sample of said fluid, mixture of fluids and solids, and emulsions, to expel said fluids, mixture of fluids and solids, and emulsions from said sampling tube, and to recycle said sequence.

2. The device for sampling fluids, mixtures of fluids and solids, and emulsions as defined in claim 1 wherein said fluid, mixtures of fluids and solids, and emulsion level sensing means comprises low level sensing means in proximity said sampling tube lower end and high level sensing means in proximity said sampling tube upper end.

3. The device for sampling fluids, mixtures of fluids and solids, and emulsions as defined in claim 2 wherein said means for detecting characteristics of said fluid, mixture of fluids and solids, and emulsions comprises ion sensing means.

4. The device for sampling fluids, mixtures of fluids and solids, and emulsions as defined in claim 3 wherein said controller means regulatory controlling means includes means having an adjustable orifice therein whereby the air entrapped in said sampling tube may be bled off permitting said fluid, mixture of fluid and solids and emulsions to enter said sampling tube lower most end at a controllable rate, means for receiving the output of said level sensing means comprising sensing transformers operably connected to said low level and high level sensing means whereby said sensing transformer indicates an output when the level is sensed, and means for operably delaying said sampling operation to permit detection of said fluid, mixture of fluids and solids and emulsion characteristics.

5. The device for sampling fluids, mixtures of fluids and solids, and emulsions as defined in claim 4 further comprising means for removing a sample of the fluid, mixture of fluids and solids, and emulsions from said sampling tube, secondary sampler means for receiving said sample removed, means for sensing the level of said sample within said sample receiving means, means for removing said sample from said sample receiving means, and field sample depository means for receiving said sample from said secondary sampler means.

6. The device for sampling fluids, mixtures of fluids and solids, and emulsions as defined in claim 5 wherein said means for removing said sample of the fluid, mixture of fluids and solids, and emulsions from said sampling tube comprises solenoid valve means and vacuum pump means whereby the sample may be withdrawn from said sample tube by air pressure, and wherein said means for removing said sample from said sample receiving means comprises air pressure means to expel said sample to said field sample depository.

7. The device for sampling fluids, mixtures of fluids and solids, and emulsions as defined in claim 1 further comprising electrode wash means located interiorly to said sampling tube for spray washing said fluid, mixture of fluid and solid, and emulsion characteristic detecting means; and controller means for operably controlling said spray wash.

8. A process for sampling fluids, mixtures of fluids and solids, and emulsions comprising the steps of permitting the entrance of a sample of the fluid, mixture of fluids and solids, and emulsions into a sampling tube, permitting the sample to rise in the sampling tube, sensing the level of the sample in the sampling tube, measuring the characteristics of said sample, expelling said sample from said sampling tube, sensing the completion of the sample expelling step, and repeating said sampling steps.

9. The process of sampling fluids, mixtures of fluids and solids, and emulsions as defined in claim 8 further comprising the step of controlling the rate of rise of the sample in said sampling tube whereby solid particles in said fluid mixture may settle out permitting the detection of the sample in a clear liquor state.

10. The device for sampling agitated fluids, mixtures of fluids and solids, and emulsions as defined in claim 9 further comprising the steps of delaying the expulsion of the sample from said sampling tube and removing a portion of the sample in its clear liquor state.

11. The process for sampling agitated fluids, mixtures of fluids and solids, and emulsions as defined in claim 10 further comprising the step of receiving said portion of said sample removed from said sampling tube in a secondary sampler container, sensing the level of said portion received in said container, and transferring said portion received to a sample depository.

* * * * *